No. 644,771. Patented Mar. 6, 1900.
R. E. KIMBALL.
BALL BEARING.
(Application filed Sept. 7, 1899.)
(No Model.)
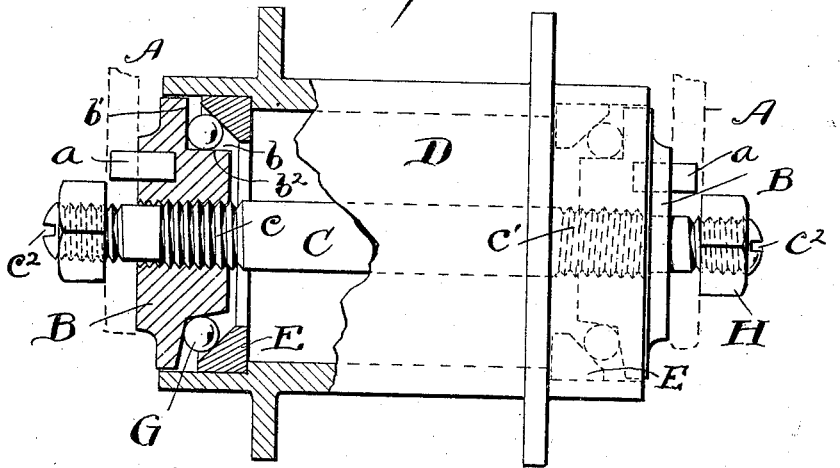
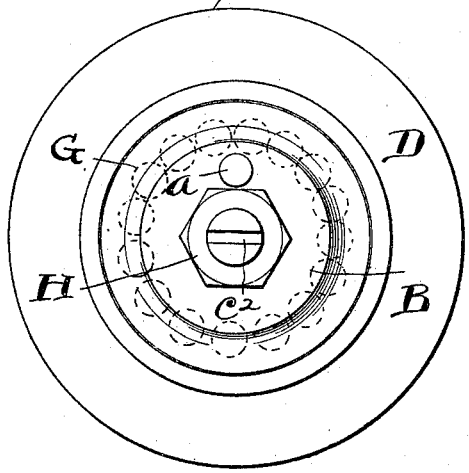
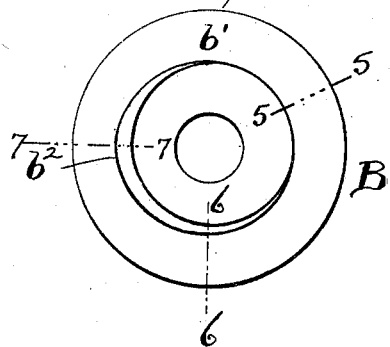
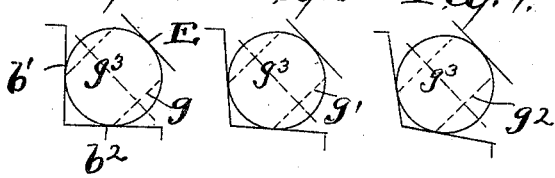
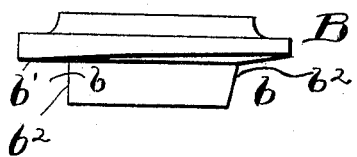
Witnesses.
E. B. Gilchrist
Philip E. Knowlton
Inventor:
Robert E. Kimball,
By his Attorneys,
Thurston & Bates

UNITED STATES PATENT OFFICE.

ROBERT E. KIMBALL, OF CLEVELAND, OHIO.

BALL-BEARING.

SPECIFICATION forming part of Letters Patent No. 644,771, dated March 6, 1900.

Application filed September 7, 1899. Serial No. 729,675. (No model.)

*To all whom it may concern:*

Be it known that I, ROBERT E. KIMBALL, a citizen of the United States, residing at Cleveland, in the county of Cuyahoga and State of Ohio, have invented a certain new and useful Improvement in Ball-Bearings, of which the following is a full, clear, and exact description, reference being had to the accompanying drawings.

In ball-bearings as commonly constructed there is considerable friction due to the contact of the balls with one another. To eliminate that friction, separators of various kinds have been employed to prevent the balls from touching. It is a question whether the friction in a ball-bearing is materially reduced by the employment of separators, because while friction between the balls themselves is prevented there is necessarily more or less friction between the balls and the separators.

The object of my invention is to substantially prevent friction between the balls without using some friction-producing device to effect that result. This result is attained through the peculiar form of the non-rotative part of the ball-raceway, whereby as the balls come into that part of the raceway where they support the weight their rate of movement is gradually accelerated, with the result that they automatically separate.

The present invention resides in the form of the non-rotative part of the ball-raceway and in the combination of parts constituting the bearing, substantially as shown and described, and pointed out definitely in the claims.

In the drawings, Figure 1 is a front view, partly in longitudinal section, of a ball-bearing embodying my invention. Fig. 2 is an end view thereof, with the position of the balls therein indicated by dotted lines. Fig. 3 is an inside view of the non-rotative member of the bearing. Fig. 4 is a bottom edge view of the same; and Figs. 5, 6, and 7 are respectively radial sections on the lines 5, 6, and 7 in Fig. 3.

The bearing as shown is applied to the front wheel of a bicycle; but it is applicable to any use to which ball-bearings are put.

A A represent the front forks of the bicycle. B B represent the two non-rotative members of the bearing, which are prevented from rotating by means of pins $a$, which project from their outer faces and enter holes in the forks A. These non-rotative members, which I call "cups," have central openings, which are oppositely screw-threaded and screw onto the oppositely-threaded ends $c\,c'$ of the axle C. To adjust these cups, this axle may be rotated by any suitable means—as, for example, a screw-driver which engages in one of the transverse slots $c^2$ in the ends of the axle—whereby the cups, if they are prevented from rotating, will be drawn toward or from each other. The nuts H clamp the forks against the cups and act as jam-nuts to prevent the accidental turning of the axle.

D represents the hub of the front wheel. In the ends of this hub are secured the rotative members of the bearing—viz., the internal cones E E. These cones and the cups B form the ball-raceways in which the balls G are confined. The cones E are true cones, and the surfaces are inclined, preferably, forty-five degrees to the axis. Each of the cups B has an annular groove $b$, in which are two bearing-surfaces $b'\,b^2$, which lie at an angle to each other, substantially as shown. In the upper half of the cup these surfaces are at a convenient angle to each other, that shown being a right angle for the quadrant from the front of the wheel to the extreme top and a gradually-widening angle from there for the next quadrant. Thus in Figs. 1 and 5 the surface $b'$ is vertical and the surface $b^2$ horizontal in radial section. In the lower part, preferably the lower half of the raceway, the angle between the surfaces $b'\,b^2$ is gradually increasing in the direction in which the balls travel. In a bicycle, where the balls always travel in the same direction, the angle increases, preferably, uniformly from the front of the bearing to the rear. In other words, the angle between these surfaces begins to increase where the balls begin to support the load and continuously increases throughout such support. Fig. 7 is a radial section of the bearing at its widest angle. Fig. 6 is a similar section at about the lowest point of the circumference, and Fig. 5 is a similar section at a point in the upper half of the bearing.

The balls in the raceway rotate upon their axes $g^3$ in contact with the surfaces $b'$ $b^2$ of the cup in an upper part of the bearing in the circles indicated by $g$ $g$ in Fig. 5; but where the balls enter that part of the raceway wherein the angle between the surfaces $b'$ $b^2$ is increased the balls turn about their axes against said surfaces $b'$ $b^2$ in larger circles, which circles increase proportionately to the increase in the angle between the surfaces $b'$ $b^2$. The balls in that part of the raceway shown in Fig. 6 turn on their axes in the larger circles indicated by $g'$, while where the angle is widest, Fig. 7, they turn upon the still larger circles $g^2$. The result is that as the balls enter that part of the raceway where the angle between the surfaces $b'$ $b^2$ begins to increase the speed of the balls increases, and hence each ball gradually draws away from the ball behind it until said balls pass the point where the angular divergence of the surfaces $b'$ $b^2$ is greatest, after which, when the balls enter that part of the raceway wherein the angle between the surfaces $b'$ $b^2$ is decreasing and where they are not under pressure, they come together. The balls in the upper half of the bearing may contact to the same extent that they do in the corresponding part of an ordinary ball-bearing; but since they bear no weight and are subject to very little pressure such contact creates very little friction.

If the bearing is intended for use with a shaft revolving in one direction as often as the other, the widest angle of the annular groove will be the lowest point in the bearing, where the weight supported is greatest, and the angle will decrease from this point in each direction.

Having described my invention, what I claim as new, and desire to secure by Letters Patent, is—

1. In a ball-bearing, a non-rotative member, provided with an annular groove having two bearing-surfaces which are disposed to each other at a varying angle, substantially as specified.

2. In a ball-bearing, a non-rotative member, provided with an annular groove having two bearing-surfaces which are disposed angularly with respect to each other, the angle between them being a gradually-decreasing angle in both directions from that part of the circumference where the balls support the weight, substantially as specified.

3. In a ball-bearing, a non-rotative member provided with an annular groove having two bearing-surfaces which are disposed angularly with respect to each other, the angle between them being a gradually-decreasing angle in both directions and for a part of the circumference from near a point where the weight is to be supported, and a uniform angle for the remaining part of the circumference, combined with a rotative member having a bearing-surface, and balls confined in the raceway between said members, substantially as specified.

4. A non-rotary axle having oppositely-threaded ends, two non-rotating ball-bearing cups upon said threaded ends, each having an annular groove with two ball-bearing surfaces which are angularly disposed with respect to each other, said angle being a gradually-decreasing angle in both directions and for a part of the circumference from the place where the weight is to be supported, and means for preventing the rotation of said cups, with a rotative hub, two cones secured in said hub, and balls confined in the raceways between said cups and cones, substantially as specified.

In testimony whereof I hereunto affix my signature in the presence of two witnesses.

ROBERT E. KIMBALL.

Witnesses:
MAUDE L. KIMBALL,
FANNIE E. KIMBALL.